(12) United States Patent
Eckel et al.

(10) Patent No.: US 10,590,042 B2
(45) Date of Patent: Mar. 17, 2020

(54) PHOTOPOLYMER RESINS WITH SOLID AND LIQUID PHASES FOR POLYMER-DERIVED CERAMICS

(71) Applicant: HRL Laboratories, LLC, Malibu, CA (US)

(72) Inventors: Zak C. Eckel, Thousand Oaks, CA (US); Jacob M. Hundley, Thousand Oaks, CA (US); Robert Mone, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/946,680

(22) Filed: Apr. 5, 2018

(65) Prior Publication Data

US 2019/0002353 A1   Jan. 3, 2019

Related U.S. Application Data

(60) Provisional application No. 62/526,528, filed on Jun. 29, 2017.

(51) Int. Cl.

| | | |
|---|---|---|
| C04B 35/589 | (2006.01) | |
| C04B 35/524 | (2006.01) | |
| B28B 1/00 | (2006.01) | |
| C04B 35/571 | (2006.01) | |
| C04B 35/597 | (2006.01) | |
| C04B 35/583 | (2006.01) | |
| C08L 83/08 | (2006.01) | |
| C04B 35/634 | (2006.01) | |
| C08L 83/04 | (2006.01) | |
| B33Y 70/00 | (2020.01) | |
| C01B 21/064 | (2006.01) | |
| C08L 83/02 | (2006.01) | |
| C08G 77/20 | (2006.01) | |
| C08G 77/28 | (2006.01) | |

(52) U.S. Cl.
CPC ............ *C04B 35/589* (2013.01); *B28B 1/001* (2013.01); *C04B 35/524* (2013.01); *C04B 35/571* (2013.01); *C04B 35/583* (2013.01); *C04B 35/597* (2013.01); *C04B 35/63452* (2013.01); *C08L 83/08* (2013.01); *B33Y 70/00* (2014.12); *C01B 21/0648* (2013.01); *C01P 2004/03* (2013.01); *C04B 2235/483* (2013.01); *C04B 2235/486* (2013.01); *C04B 2235/6562* (2013.01); *C04B 2235/6565* (2013.01); *C04B 2235/6567* (2013.01); *C04B 2235/77* (2013.01); *C04B 2235/96* (2013.01); *C08G 77/20* (2013.01); *C08G 77/28* (2013.01); *C08L 83/02* (2013.01); *C08L 83/04* (2013.01)

(58) Field of Classification Search
CPC ..................................................... C04B 35/589
See application file for complete search history.

(56) References Cited

U.S. PATENT DOCUMENTS

| | | | | |
|---|---|---|---|---|
| 4,248,814 A | * | 2/1981 | Yajima | .................... C04B 33/13 264/624 |
| 6,138,791 A | * | 10/2000 | Zanzie | ..................... F01N 1/24 181/252 |
| 2008/0045623 A1 | * | 2/2008 | Yamaguchi | ........... C03C 25/106 522/83 |
| 2008/0194721 A1 | | 8/2008 | Arney et al. | |
| 2010/0255289 A1 | * | 10/2010 | Lewinsohn | ........... C04B 35/195 428/325 |

FOREIGN PATENT DOCUMENTS

WO    WO-2014062943 A1 *  4/2014  ............. C08B 26/32

OTHER PUBLICATIONS

Manapat et al., "3D Printing of Polymer Nanocomposites via Stereolithography" Macromol. Mater. Eng. 2017, 302, 1600553.
Zanchetta et al., "Stereolithography of SiOC Ceramic Microcomponents" Adv. Mater. 2016, 28, 370-376.
Colombo et al., "Additive manufacturing techniques for fabricating complex ceramic components from preceramic polymers" American Ceramic Society Bulletin, vol. 96, No. 3 (Apr. 2017).
Bernardo et al., "Advanced Ceramics from Preceramic Polymers Modified at the Nano-Scale: A Review" Materials 2014, 7, 1927-1956; doi:10.3390/ma7031927.
International Search Report and Written Opinion, PCT/US2018/026347, dated Aug. 21, 2018.

* cited by examiner

*Primary Examiner* — Vickey Nerangis
(74) *Attorney, Agent, or Firm* — O'Connor & Company (57) ABSTRACT

Resins for 3D printing of a preceramic composition loaded with a solid polymer filler, followed by converting the preceramic composition to a 3D-printed ceramic material, are described. Some variations provide a preceramic composition containing a radiation-curable liquid resin formulation and a solid polymer filler dispersed within the liquid resin formulation. The liquid resin formulation is compatible with stereolithography, UV curing, and/or 3D printing. The solid polymer filler may be an organic polymer, an inorganic polymer, or a combination thereof. The solid polymer filler may itself be an inorganic preceramic polymer, which may have the same composition as a polymerized variant of the liquid resin formulation, or a different composition. Many compositions are disclosed as options for the liquid resin formulation and the solid polymer filler.

16 Claims, 5 Drawing Sheets

PHOTOPOLYMER RESINS WITH SOLID AND LIQUID PHASES FOR POLYMER-DERIVED CERAMICS

PRIORITY DATA

This patent application is a non-provisional application with priority to U.S. Provisional Patent App. No. 62/526,528, filed Jun. 29, 2017, which is hereby incorporated by reference herein.

FIELD OF THE INVENTION

The present invention generally relates to formulations suitable for making preceramic polymers, which can be converted into ceramic structures.

BACKGROUND OF THE INVENTION

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear.

There is also high commercial demand for additively manufactured (3D-printed) ceramics in fields including industrial filtration (molten metal filters, flow separators); metal processing (casting molds/blanks); implantable dental and medical devices; and semiconductor processing. Additive manufacturing of ceramic materials is also of interest for propulsion components, thermal protection systems, porous burners, microelectromechanical systems, and electronic device packaging, for example.

No mature method for 3D printing ceramic matrix composites exists. Currently, CMC materials are limited to manual lay-up, molding, or thermoforming. There are also known techniques for sintering ceramic particles or using ceramic particles printed in an organic binder, both of which typically produce porous ceramics that have lower strength than the parent material. Ceramic structures are typically sintered as compacted porous materials, severely limiting the manufacturable geometries.

Formulations have been described for creating ceramic materials that can be printed (additively manufactured) with various methods such as stereolithography techniques and laser sintering. These are typically unreinforced ceramics that do not contain a second phase and suffer from low fracture toughness. These methods are described in Zocca et al., "Additive Manufacturing of Ceramics: Issues, Potentialities, and Opportunities" *J. Am. Ceram. Soc.*, 98 [7] 1983-2001 (2015).

In addition, formulations which can create 1D or 2D ceramics, or very small 3D structures, have been described. See U.S. Pat. No. 4,816,497 issued Mar. 28, 1989 to Lutz et al.; U.S. Pat. No. 5,698,485 issued Dec. 16, 1997 to Bruck et al.; U.S. Pat. No. 6,573,020 issued Jun. 3, 2003 to Hanemann et al.; U.S. Pat. No. 7,582,685 issued Sep. 1, 2009 to Arney et al.; and U.S. Patent App. Pub. No. US2006/0069176A1 published Mar. 30, 2006 to Bowman et al.

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and—in contrast to metals—brittle ceramics have little ability to resist fracture. This processing challenge has limited the ability to take advantage of ceramics' impressive properties, including high-temperature capability, environmental resistance, and high strength. Recent advances in additive manufacturing have led to a multitude of different techniques, but all additive manufacturing techniques developed for ceramic materials only process unreinforced ceramics and not ceramic matrix composites. Only a few of the commercially available three-dimensional (3D) printing systems offer printing of ceramics, either by selective curing of a photosensitive resin that contains ceramic particles, selective deposition of a liquid binder agent onto ceramic particles (binder jetting), or selective fusion of a powder bed with a laser. All these techniques are limited by slow fabrication rates, and in many cases, a time-consuming binder removal process. By starting with powders that need to be consolidated to a dense part, it is an almost insurmountable challenge to add reinforcement and create ceramic matrix composites without fusing or reacting the matrix and the second phase, losing reinforcing capability. Furthermore, many additive processes introduce large thermal gradients that tend to cause cracks in ceramics. Pores, cracks, and inhomogeneities are often responsible for the low strength and poor reliability of additively manufactured ceramic parts.

Preceramic polymers are a class of polymers which allow, via a thermal treatment, a conversion of a polymer part to a ceramic material. Typically, these preceramic polymers contain silicon (Si) in the molecular backbone, with the resulting material containing Si. There are a wide variety of known preceramic polymers. Examples include polysilazanes, borazine-modified hydridopolysilazanes, polysilanes, polycarbosilanes, silicone resins, polyborazines, polyvinylborazine, polyborazylene, and decaborane-based polymers. These preceramic polymers have been used to form specific polymer-based structures that can be subsequently heat-treated (pyrolyzed or sintered) to create near net-shape ceramic structures.

A stereolithography technique provides a method to build a 3D polymer microstructure in a layer-by-layer process. This process usually involves a platform (e.g., substrate) that is lowered into a photomonomer bath in discrete steps. At each layer, a laser is used to scan over the area of the photomonomer that is to be cured (i.e., polymerized) for that particular layer. Once the layer is cured, the platform is lowered by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al.

Modifications to the above-described stereolithography technique have been developed to improve the polymer resolution by using laser optics and special resin formulations. Also, modifications have been made to decrease the fabrication time of the 3D polymer structure by using a dynamic pattern generator to cure an entire layer at once. One example of such a modification is disclosed in Bertsch et al., "Microstereo-lithography: A Review," *Materials Research Society Symposium Proceedings* Vol. 758, 2003. Another advancement to the standard stereolithography technique includes a two-photon polymerization process, as disclosed in Sun et al., "Two-Photon Polymerization And 3D Lithographic Microfabrication," *Advances in Polymer Science* Vol. 170, 169-273, 2004.

There exists a need for creating ceramic parts of various sizes through 3D printing, for engineering and other applications, without relying on either sintering of ceramic particles or the use of ceramic particles printed in an organic binder, both of which produce porous ceramics with reduced strength. Formulations are desired that allow for the direct conversion of preceramic polymers to dense ceramics with properties that approach the theoretical maximum strength of the base materials.

SUMMARY OF THE INVENTION

The present invention addresses the aforementioned needs in the art, as will now be summarized and then further described in detail below.

Some variations provide a preceramic composition containing a radiation-curable liquid resin formulation and a solid polymer filler dispersed within the liquid resin formulation. The liquid resin formulation is preferably compatible with stereolithography, UV (or other electromagnetic radiation) curing, and/or UV-based 3D printing. The radiation-curable liquid resin formulation of some embodiments is polymerizable when exposed to electromagnetic radiation wavelengths from 200 nm to 500 nm, for example.

In some embodiments, the radiation-curable liquid resin formulation is a UV-curable inorganic resin formulation. In other embodiments, the radiation-curable liquid resin formulation is a UV-curable organic resin formulation.

The solid polymer filler may be present at a concentration from about 0.1 vol % to about 95 vol % of the preceramic composition, such as from about 1 vol % to about 70 vol % of the preceramic composition.

The solid polymer filler may be an organic polymer, an inorganic polymer, or a combination thereof. In some embodiments, the solid polymer filler is an inorganic polymer characterized by a pyrolysis temperature equal to, or greater than, the pyrolysis temperature of a polymerized variant of the liquid resin formulation. In other embodiments, the solid polymer filler is an inorganic polymer characterized by a pyrolysis temperature less than the pyrolysis temperature of a polymerized variant of the liquid resin formulation.

In certain embodiments, the solid polymer filler is a silicon-based polymer. In other certain embodiments, the solid polymer filler is a boron-based polymer.

The solid polymer filler may itself be an inorganic preceramic polymer. In some of these embodiments, the solid polymer filler has the same composition as a polymerized variant of the liquid resin formulation. In other embodiments, the solid polymer filler has a different composition than a polymerized variant of the liquid resin formulation.

In various embodiments of the preceramic composition, the solid polymer filler is selected from the group consisting of poly(carbosilanes), poly(silazanes), poly(silsesquioxanes), poly(borosiloxanes), poly(borosilanes), poly(borosilazanes), poly(carbosiloxanes), poly(silylcarboimides), poly(silsesquicarbodiimides), polyborazines, and combination thereof.

A surface of the solid polymer filler may be modified to aid dispersion of the solid polymer filler within the liquid resin formulation. For example, the solid polymer filler may be modified with surface functional groups, or another material adsorbed onto the surface or absorbed into the solid polymer filler. In some embodiments, the preceramic composition further comprises a surfactant or dispersion agent that aids dispersion of the solid polymer filler within the liquid resin formulation.

The preceramic composition may further comprise a solid metal filler and/or a solid ceramic filler. In some embodiments, the preceramic composition comprises a solid metal filler that has a melting temperature equal to, or greater than, the pyrolysis temperature of a polymerized variant of the liquid resin formulation. In these or other embodiments, the preceramic composition comprises a solid metal filler that has a melting temperature less than the pyrolysis temperature of a polymerized variant of the liquid resin formulation.

In certain embodiments, the liquid resin formulation comprises a monomer molecule containing (i) non-carbon atoms and (ii) two or more functional groups selected from the group consisting of aliphatic ether, cyclic ether, vinyl ether, epoxide, cycloaliphatic epoxide, oxetane, and combinations, analogues, or derivatives thereof.

In certain embodiments, the liquid resin formulation comprises a monomer molecule containing (i) non-carbon atoms and (ii) two or more C=X double bonds, two or more C≡X triple bonds, or at least one C=X double bond and at least one C≡X triple bond, wherein X is selected from C, S, N, O, or a combination thereof.

In certain embodiments of the invention, the liquid resin formulation comprises:

(a) a first molecule comprising two or more C=X double bonds or C≡X triple bonds, wherein X is selected from C, S, O, and/or N, and wherein the first molecule further comprises first non-carbon atoms in the main chain or side chains;

(b) a second molecule comprising two or more functional groups selected from aliphatic ether, cyclic ether, vinyl ether, epoxy, cycloaliphatic epoxy, oxetane, or a combination thereof, wherein the third molecule further contains second non-carbon atoms in the main chain or side chains; and (c) a third molecule comprising R—Y—H, wherein R is an organic group or an inorganic group, and wherein Y is selected from the group consisting of S, N, O, and combinations thereof.

In certain embodiments of the invention, the liquid resin formulation comprises:

(a) a first molecule comprising two or more C=X double bonds or C≡X triple bonds, wherein X is selected from C, S, O, and/or N, and wherein the first molecule further comprises first non-carbon atoms in the main chain or side chains; and (b) a second molecule comprising R—Y—H, wherein R is an organic group or an inorganic group, and wherein Y is selected from the group consisting of S, N, O, and combinations thereof.

DETAILED DESCRIPTION OF EMBODIMENTS OF THE INVENTION

The compositions (also referred to as formulations), structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of this invention provide resin formulations and methods which may be used for 3D printing (e.g., by stereolithography) of an intermediate structure followed by thermally treating (e.g., by firing or pyrolyzing) to convert the 3D intermediate structure into a 3D ceramic structure. The monomers and polymeric systems can be converted into potentially complex 3D-printed ceramic shapes with high thermal stability and mechanical strength. The 3D-printed ceramic material may be prepared directly from 3D-printed preceramic polymer material, which contains the dispersed solid polymer fillers. Electromagnetic-radiation curability of the liquid resin formulation enables definition of three-dimensional shapes via 3D printing.

"Preceramic" in this disclosure refers to the capability to be ultimately converted to a ceramic material. A "preceramic composition" is a composition that can be converted into a ceramic material, either directly (e.g., by pyrolysis) or via multiple steps (e.g., by polymerization followed by pyrolysis). In particular, a preceramic composition may contain a preceramic polymer that can be pyrolyzed into a ceramic material, a resin that can be polymerized into a preceramic polymer, or both of these.

A "preceramic polymer" is characterized in that at least some of the polymer converts to a ceramic material when heated to a temperature above 200° C. at atmospheric pressure in a substantially inert gas environment. Preferably, at least 50 wt %, more preferably at least 90 wt %, and most preferably at least 99 wt % (e.g., essentially all) of the polymer converts to a ceramic material when heated to a temperature above 200° C. at atmospheric pressure in a substantially inert gas environment.

As intended herein, a "resin" means a composition capable of being polymerized or cured, further polymerized or cured, or crosslinked. Resins may include monomers, oligomers, prepolymers, or mixtures thereof. As used herein, "polymer resin" means monomer, oligomer, prepolymer, or other molecule that is converted to a polymer.

The resin formulations contain suspended solid polymer fillers, such as particulates, powders, fibers, or whiskers of polymers, within a radiation-curable liquid resin formulation. In particular, the disclosed preceramic compositions are mixtures of liquid resin and solid polymer filler. The polymerized form of the liquid resin formulation may be of a different composition than the solid polymer filler.

Some variations provide a preceramic composition containing a radiation-curable liquid resin formulation and a solid polymer filler dispersed within the liquid resin formulation. The liquid resin formulation is preferably compatible with stereolithography, UV (or other electromagnetic radiation) curing, and/or UV-based 3D printing. Stereolithography, laser rastering, digital light processing, liquid crystal device projection, or other techniques may be employed to 3D print the monomer formulations.

The radiation-curable liquid resin formulation of some embodiments is polymerizable when exposed to electromagnetic radiation wavelengths from 200 nm to 500 nm, such as 400-450 nm, for example. "Radiation-curable" in this disclosure is synonymous with "electromagnetic radiation—curable." All references to "UV," "UV-curable," "UV-cure-based" and the like shall include reference not only to ultraviolet radiation but also other electromagnetic radiation bands that can be effective in various embodiments, including microwave radiation, terahertz radiation, infrared radiation, visible radiation (light), ultraviolet radiation, and X-rays.

In some embodiments, the radiation-curable liquid resin formulation is a UV-curable inorganic resin formulation, which may be a preceramic resin formulation. In other embodiments, the radiation-curable liquid resin formulation is a UV-curable organic resin formulation. At least one of the liquid resin formulation or the solid polymer filler (or both of these) needs to be a preceramic formulation, to enable later conversion to a ceramic structure.

In certain embodiments, the radiation-curable liquid resin formulation is not a preceramic polymer formulation but the solid polymer filler is a preceramic polymer. For example, the radiation-curable liquid resin formulation, when radiation-cured, may form an organic polymer that primarily functions as a binder in the preceramic composition. The organic polymer may decompose and not be present in the final ceramic material, or the organic polymer may form non-ceramic material (e.g., a carbonaceous phase) within the final ceramic material.

UV-curable resin formulations may be selected as described in commonly owned U.S. Pat. No. 8,906,593, issued Dec. 9, 2014; U.S. Pat. No. 9,075,312, issued Jul. 7, 2015; U.S. patent application Ser. No. 15/406,762, filed Jan. 15, 2017; and/or U.S. patent application Ser. No. 15/822,199, filed Nov. 26, 2017, which are hereby incorporated by reference herein.

The solid polymer filler may be present at a concentration from about 0.1 vol % to about 95 vol % of the preceramic composition, such as from about 1 vol % to about 70 vol % of the preceramic composition. In various embodiments, the solid polymer filler is at a concentration of about 0.5, 1, 2, 5, 10, 20, 30, 40, 50, 60, 70, 80, or 90 vol % of the preceramic composition. Typically, all or the majority of the remainder of the preceramic composition is the liquid resin formulation.

The solid polymer filler may be an organic polymer, an inorganic polymer, or a combination thereof. In certain embodiments, the solid polymer filler is a silicon-based polymer. In other certain embodiments, the solid polymer filler is a boron-based polymer. Mixtures of more than one type of solid polymer filler may be present.

The solid polymer filler may be selected from the group consisting of poly(carbosilanes), poly(silazanes), poly(silsesquioxanes), poly(borosiloxanes), poly(borosilanes), poly(borosilazanes), poly(carbosiloxanes), poly(silylcarboimides), poly(silsesquicarbodiimides), polyborazines, and combination thereof. The solid polymer filler is preferably fully polymerized, but in some embodiments, some uncured monomer may be present (e.g., carbosilanes, silazanes, etc.) along with cured polymer.

When the solid polymer fillers are themselves preceramic polymers, they may be converted to various ceramic materials including, but not limited to, silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), boron nitride (BN), silicon metal carbides, silicon metal oxides, silicon metal nitrides, graphite, diamond, or a combination thereof.

In some embodiments, the solid polymer filler is an inorganic polymer characterized by a pyrolysis temperature equal to, or greater than, the pyrolysis temperature of a polymerized variant of the liquid resin formulation. In other embodiments, the solid polymer filler is an organic or inorganic polymer characterized by a pyrolysis temperature less than the pyrolysis temperature of a polymerized variant of the liquid resin formulation. The polymerized variant of the liquid resin formulation means the polymer obtained by polymerizing or curing the liquid resin formulation.

The "pyrolysis temperature" of a polymer is defined herein as the minimum thermal decomposition temperature from thermogravimetric analysis of a 10-milligram sample in a nitrogen atmosphere at a 10° C./min heating rate, as described in Beyler and Hirschler, "Thermal Decomposition of Polymers" *SFPE Handbook of Fire Protection Engineering* 2, Section 1, Chapter 7, pages 111-131, 2002, which is hereby incorporated by reference herein. Note that the pyrolysis temperature of a polymer is a property of that polymer, similar to polymer glass-transition temperature, without reference to how the polymer is made or used.

In various embodiments, the pyrolysis temperature of the solid polymer filler is about, at least about, or at most about 100° C., 150° C., 200° C., 250° C., 300° C., 350° C., 400° C., 450° C., or 500° C.

In various embodiments, the pyrolysis temperature of the polymerized variant of the liquid resin formulation is about, at least about, or at most about 100° C., 150° C., 200° C., 250° C., 300° C., 350° C., 400° C., 450° C., or 500° C.

When it is desired to actually pyrolyze a solid polymer filler, the polymerized liquid resin formulation, or both of these, the preceramic composition containing the solid polymer filler should be subjected to a reaction temperature at least equal to the pyrolysis temperature of the applicable polymer, and preferably higher than its pyrolysis temperature, for some period of time.

The solid polymer filler may itself be an inorganic, cured preceramic polymer. In some of these embodiments, the solid polymer filler has the same composition as a polymerized variant of the liquid resin formulation. In other embodiments, the solid polymer filler has a different composition than a polymerized variant of the liquid resin formulation. Some embodiments provide a preceramic liquid resin formulation—suitable for making a first preceramic polymer—mixed with a dispersed solid phase containing a second preceramic (cured) polymer that is different than the first preceramic polymer.

The solid polymer filler may be dispersed within the liquid resin formulation as a slurry, an emulsion, a solid solution, or some other form of dispersion. In some embodiments, a portion of solid polymer filler is well-dispersed within the liquid resin formulation while the remainder is non-dispersed, such as in the form of precipitated or agglomerated solid polymer filler. Preferably, at least 80 wt %, more preferably at least 90 wt %, and most preferably at least 95 wt % or at least 99 wt % (such as essentially all) of the solid polymer filler is well-dispersed within the liquid resin formulation.

"Well-dispersed" solid polymer filler means that individual particles of solid polymer filler are uniformly (homogeneously) distributed in space within the liquid resin formulation. Well-dispersed solid polymer filler leads to uniform shrinkage during pyrolysis. Common methods to analyze the dispersion of particles include optical microscopy, scanning electron microscopy, transmission electron microscopy, and ultraviolet-visible (UV-Vis) spectroscopy. Tyson et al., "A quantitative method for analyzing the dispersion and agglomeration of nano-particles in composite materials" *Composites Part B: Engineering* Volume 42, Issue 6, September 2011, Pages 1395-1403, is hereby incorporated by reference herein for its teachings of quantifying dispersions of particles.

Dispersion of solid polymer filler within the liquid resin formulation may be achieved for example by a mechanical process of mixing polymer and filler, wherein shear forces are applied to the mixture. Ultrasonic mixing may also be employed. Settling of solid polymer filler particles may be minimized by optimization of particle size, adjustment to viscosity of the liquid resin formulation, and/or control of mixing conditions such as temperature.

The particle size of the solid polymer filler may vary widely. In some embodiments, the solid polymer filler has an average particle size (e.g., diameter, effective diameter, or length) from about 1 nanometer to about 1000 microns, such as about 10, 50, 100, 200, 300, or 500 nanometers, or about 1, 10, 50, 100, 200, 300, or 500 microns. Even larger particle sizes may be used for the solid polymer filler, such as about 1, 2, 3, 4, 5 millimeters or more.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd. (Worcestershire, England). Image analysis to estimate particle sizes and distributions can be done directly on photomicrographs, scanning electron micrographs, or other images. Finally, sieving is a conventional technique of separating particles by size.

The geometric shape of the solid polymer filler may vary widely. In some embodiments, the solid polymer filler is in the form of powders (i.e. fine particles), short fibers (e.g., with length of 1-100 microns), long fibers (e.g., with length of 100-1000 microns), whiskers, nanotubes, nanorods, flat platelets, or a combination thereof.

A surface of the solid polymer filler may be modified to aid dispersion of the solid polymer filler within the liquid resin formulation. For example, the solid polymer filler may be modified with surface functional groups, or another material adsorbed onto the surface or absorbed into the solid polymer filler. In some embodiments, the preceramic composition further comprises a surfactant or dispersion agent that aids dispersion of the solid polymer filler within the liquid resin formulation.

Depending on the chemistry and viscosity of the resin, the solid polymer filler may be treated to increase its compatibility with and wetting of the resin, the solubility of the filler within the resin, and/or bonding between the filler and the resin. Dispersion aids may be chosen to match the isoelectric point of the solid polymer filler particle with the liquid resin.

Surfactants may be selected to contain a first component that bonds to the surface of the filler and a second component that solvates in the liquid resin system. Surface functionality may be added by covalently bonding functional group(s) to the surface of the solid polymer filler. Examples include silane surface modifiers with active groups that either react with the resin or increase the wettability and dispersability in the ceramic material. Silane surface modifiers include mercaptotrimethoxysilane, vinyltrimethoxysilane, or (3-glycidyloxypropyl) trimethoxysilane, for example.

The use of solid polymer fillers that are only partially cured or in a green state enables the reaction or crosslinking between the radiation-curable liquid resin and the solid polymer filler, providing robust cured polymer parts with higher mass retention, in some embodiments.

The preceramic composition may further comprise a solid metal filler and/or a solid ceramic filler, in addition to the solid polymer filler. In some embodiments, the preceramic composition comprises a solid metal filler that has a melting temperature equal to, or greater than, the pyrolysis temperature of a polymerized variant of the liquid resin formulation. In these or other embodiments, the preceramic composition comprises a solid metal filler that has a melting temperature less than the pyrolysis temperature of a polymerized variant of the liquid resin formulation. The melting temperature of a solid metal filler may be about 200° C., 300° C., 400° C., 500° C., 600° C., 700° C., 800° C., 900° C., 1000° C., 1100° C., 1200° C., 1300° C., 1400° C., 1500° C., or higher, for example.

The extremely high melting point of many ceramics poses a challenge to additive manufacturing to make a 3D part, as compared with metals and polymers. Ceramics cannot be cast or machined easily. By contrast, the present methods enable geometrical flexibility. As described herein, preceramic resins that are cured with ultraviolet (UV) light in a stereolithography 3D printer or through a patterned mask, for example, form 1D, 2D, or 3D polymer structures that can have complex shape and cellular architecture. These polymer structures can then be thermally converted to the corresponding 1D, 2D, or 3D ceramic part, preferably with low shrinkage, or at least uniform shrinkage.

Some variations of the invention are premised on direct, free-form 3D printing of a preceramic composition loaded with a solid polymer filler, followed by converting the preceramic composition to a 3D-printed ceramic matrix composite.

The preceramic monomer formulations are designed to allow the ceramic structures to be formed with preferably high thermal stability (such as chemical and physical stability at temperatures greater than 1500° C.) and good mechanical strength (including stiffness, flexural strength, hardness, and/or fracture toughness). The solid polymer filler, among other benefits, can improve mechanical properties, enhance part fidelity, achieve alternative compositions, and introduce additional functionalities.

The invention in various embodiments applies to additively manufactured components, such as to reduce part count, scrap, or non-recurring engineering. Some embodiments apply to high-wear or high-temperature applications that would necessitate ceramic materials. Specific applications of interest include, for example, propulsion structures (vanes, impellors, nacelles, and thrusters), control surfaces (fins and leading edges), hypersonic structures (thermal protection systems and heat shields), high-wear components (brakes, clutches, and rotors), catalyst support structures, pump components, filters, brakes, and clutches.

In some embodiments, the liquid resin formulation (of the preceramic composition) comprises a first molecule containing two or more unsaturated C=X double bonds or C≡X triple bonds (or at least one C=X double bond and at least one C≡X triple bond). X is selected from C, S, O, N, or a combination thereof. These functional groups include, for example, C=C, C≡C, C=S, and C≡N. Any H atoms involved in these functional groups may be substituted with other atoms such as F or Cl, or side groups such as alkyl, ester, amine, hydroxyl, or CN. The first molecule may contain different combinations of these different unsaturated bonds. Typical unsaturated bonds are C=C double bonds at the terminal position of the molecules, in which three hydrogen atoms are bonded to carbon atoms on the C=C bonds (i.e., R—HC=CH$_2$ where R is the remainder of the first molecule). Other examples of these functional groups include vinyl, ethynyl, vinyl ether, vinyl ester, vinyl amide, vinyl triazine, vinyl isocyanurate, acrylate, methacrylate, diene, triene, or a mixture thereof.

The first molecule may contain at least one non-carbon atom in the main chain or side chains of the first molecule. Examples of non-carbon atoms that may be used include, but are not limited to, Si, B, Al, Ti, Zn, O, N, P, S, Ge, and combinations thereof. The non-carbon atoms may be a part of cyclic or acyclic groups or structures within the first molecule. The non-carbon atoms are preferably not merely single non-carbon atoms ionically bonded at the end(s) of the first molecule. In some embodiments, when X is O, the non-carbon atom is not O; or when X is N, the non-carbon atom is not N.

Examples of the first molecules include, but are not limited to, trivinylborazine; 2,4,6-trimethyl-2,4,6-trivinylcyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; tetraallyloxysilane; vinyl-terminated polydimethylsiloxane; tetravinylsilane; vinyl-terminated polydimethylsiloxane-ethylene copolymer; divinyldimethylsilane; 1,2-divinyltetramethyldisilane; 1,4-bis(vinyldimethylsilyl)benzene; vinylmethylsiloxane homopolymer; methacryloxypropyl-terminated polydimethylsiloxane; boron vinyldimethylsiloxide; vinylmethylsiloxane-dimethylsiloxane copolymer, trimethylsiloxy-terminated homopolymer; vinylethoxysiloxane-propylethoxysiloxane copolymer; vinyltrimethoxysilane; trivinylmethylsilane; diallyldimethylsilane; 1,3,5-trisilacyclohexane; B,B',B''-trithynyl-N,N',N''-trimethylborazine; B,B',B''-triethynylborazine; vinylmethoxysiloxane; acryloxypropyl(methylsiloxane) homopolymer; pentaerythritol tetraacrylate; pentaerythritol triacrylate; polyethylene glycol diacrylate; 1,6-hexanediol diacrylate; methyl methacrylate; or a combination thereof.

The first molecule, when present, may be up to about 100 wt % of the liquid resin formulation (that is, the liquid portion of the preceramic composition, excluding the mass of the solid polymer filler). In various embodiments, the first molecule is about 5, 10, 20, 30, 40, 50, 60, 70, 80, 90, or 95 wt % of the liquid resin formulation.

In some embodiments, the liquid resin formulation comprises a second molecule with a structure R—Y—H, wherein Y=O, S, N, or combinations thereof. The molecules R—Y—H can provide two or more YH groups for polymerization, and can be part of cyclic or acyclic structures. Typical YH groups are SH groups, e.g. thiol groups (also known as mercapto groups). The R groups can be organic groups such as alkyl groups, ester groups, amine groups, or hydroxyl groups, or inorganic non-carbon-containing atoms or groups. Examples of inorganic non-carbon atoms or groups in the second molecule include, but are not limited to, Si, B, Al, Ti, Zn, P, Ge, S, O, N, or combinations thereof. The reaction rate varies depending on the different molecules utilized. In some preferred embodiments, a thiol is employed with at least half of the main chain made of inorganic atoms, such as silicon. Other atoms in the main chain may include oxygen, nitrogen, and/or carbon.

The second molecule, when present, may be up to about 97 wt % of the liquid resin formulation. In various embodiments, the second molecule is about 0, 5, 10, 20, 30, 40, 50, 60, 70, 80, or 90 wt % of the liquid resin formulation. The second molecule may be present whether or not the first molecule is present.

Exemplary second molecule include, but are not limited to, pentaerythritol tetrakis(3-mercaptopropionate); trimethylolpropanetris(2-mercaptoacetate); trimethylolpropane tris (3-mercaptopropionate); tetrakis(dimethyl-3-mercaptopropylsiloxy)silane; tetrakis(dimethyl-2-mercaptoacetate siloxy)silane; (mercaptopropyl)methylsiloxane-dimethylsiloxane copolymer; (mercaptopropyl)methylsiloxane homopolymer; pentaerythritol tetrakis(2-mercaptoacetate); or a combination thereof.

In some embodiments, the liquid resin formulation comprises a third molecule with a structure R—Y, wherein Y is selected from an aliphatic ether, a cyclic ether, a vinyl ether, an epoxy, a cycloaliphatic epoxy, an oxetane group, or a combination thereof. The R groups may be selected from organic groups such as alkyl groups, ester groups, amine groups, or hydroxyl groups, or inorganic non-carbon containing atoms or groups. The third molecule may contain two or more distinct functional groups.

In some embodiments, the third molecule (when present) contains at least one non-carbon atom in the main chain or side chains. Examples of non-carbon atoms or groups in the third molecule include, but are not limited to, Si, B, Al, Ti, Zn, P, Ge, S, O, N, or combinations thereof. The inorganic non-carbon atoms or groups may be a part of cyclic or acyclic structures.

Exemplary third molecules include, but are not limited to, epoxy-functional dimethylpolysiloxane, (epoxycyclohexylethyl)methylsiloxane, (epoxycyclohexylethyl)dimethylsiloxane, 3,4-epoxycyclohexanecarboxylate, and/or 3-ethyl-3-oxetanemethanol. These monomers can be any portion of the liquid resin formulation.

In particular, the third molecule, when present, may be up to about 100 wt % of the liquid portion of the liquid resin formulation. In various embodiments, the third molecule is about 5, 10, 20, 30, 40, 50, 60, 70, 80, 90, or 95 wt % of the liquid resin formulation. The third molecule may be present whether or not the first or second molecules are present.

In some embodiments, the liquid resin formulation comprises a photoinitiator that generates free radicals under light exposure by intramolecular bond cleavage or intermolecular hydrogen abstraction. The photoinitiator may be active in the presence of UV or visible light having a wavelength from about 200 nm to about 700 nm, for example. Photoinitiators may be used when the polymerization is, or includes, free-radical polymerization. Photoinitiators may be used to initiate polymerization when exposed to other wavelengths, such as in the visible spectrum. In certain embodiments, light exposure is produced from light having one or more wavelengths selected from about 200 nm to about 700 nm, such as about 250, 300, 350, 400, 500, or 600 nm.

Different photoinitiators will generally result in different reaction rates for polymerization. A combination of different types of photoinitiators may be used in the polymerization process. More than one photoinitiator may be included to allow multi-wavelength curing, for example.

Examples of photoinitiators include, but are not limited to, 2,2-dimethoxy-2-phenylacetophenone; 2-hydroxy-2-methylpropiophenone; camphorquinone; bis(2,4,6-trimethylbenzoyl)-phenylphosphineoxide; benzophenone; benzoyl peroxide; thioxanones; dicumyl peroxide; 2,2'-azobisisobutyronitrile; camphorquinone; oxygen; nitrogen dioxide; or a combination thereof.

The photoinitiator, when present, may be up to about 10 wt % of the liquid resin formulation. In various embodiments, the photoinitiator is about 0.001, 0.005, 0.01, 0.05, 0.1, 0.5, 1, 2, 5, or 10 wt % of the liquid resin formulation.

In some embodiments, the liquid resin formulation comprises a free-radical inhibitor added in a sufficient amount to the monomer formulation to inhibit unwanted polymerization of regions outside the desired printing area. A free-radical inhibitor can improve resolution to the desired part in embodiments that employee free-radical polymerization. A free-radical inhibitor can also deter shadow curing, which is normally not desired. Additionally, a free-radical inhibitor can improve long-term stability of the liquid resin formulation and keep reaction kinetic parameters constant over time.

Exemplary free-radical inhibitors include, but are not limited to, hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, or a combination thereof. When present, the free-radical inhibitor may be up to about 5 wt % of the liquid resin formulation, such as about 0.001, 0.005, 0.01, 0.05, 0.1, 0.2, 0.5, 1, or 2 wt % of the liquid resin formulation.

Optionally the liquid resin formulation further includes a radiation-trigger free-radical initiator that is active at a wavelength substantially different from the photoinitiator. When the liquid resin formulation includes a thermal free-radical initiator, optionally the liquid resin formulation further includes a radiation-trigger free-radical initiator.

In some embodiments, the liquid resin formulation comprises a free-radical thermal initiator that generates free radicals under elevated temperature conditions. The addition of a free-radical thermal initiator allows for multiple-mechanism curing in the preceramic composition, i.e., both UV curing and thermal curing, or allows for a different polymerization reaction rate. One or a combination of different types of thermal initiators may be used in the polymerization process.

A thermal initiator may be used to crosslink unreacted vinyl groups remaining which have not reacted with the thiol group or to react the vinyl group with other available functional groups such as methyl or hydro groups on the first or second molecule, creating a second type of reaction mechanism. A thermal post-cure after 3D printing may be done, such as by heating the preceramic polymer structure up to 300° C.

Exemplary free-radical thermal initiators include, but are not limited to, benzoyl peroxide, dicumyl peroxide, 2,2'-azobisisobutyronitrile, or a combination thereof. When present, the free-radical thermal initiator may be up to about 10 wt % of the liquid resin formulation, such as about 0.001, 0.01, 0.1, 1, 2, or 5 wt % of the liquid resin formulation.

In some embodiments, the liquid resin formulation comprises a cationic photoinitiator or photoacid generator, such as (but not limited to) sulphonium, iodonium, and/or ferrocenium cation paired with a non-nucleophilic anion. For example, the liquid resin formulation may contain a salt which under light exposure creates acids (e.g., Brønsted acids) by cleavage of the sulphonium, iodonium, and/or ferrocenium cation of the onium salt, paired with a proton donor. Cationic photoinitiators are typically active under light wavelengths from 200 nm to 350 nm. Initiators that are active at lower or higher wavelengths are also applicable to these monomer formulations. Cationic photoinitiators or ionic photoacid generators may be used when the polymerization is, or includes, cationic polymerization. Different cationic photoinitiators or photoacid generators will generally result in different reaction rates for polymerization. A combination of different types of cationic photoinitiators and/or photoacid generators (including ionic and non-ionic photoacid generators) may be used in the polymerization process.

Exemplary cationic photoinitiators or photoacid generators include, but are not limited to, sulfonium, iodonium, and ferrocenium salts; cyclopentacienylcumene-iron hexafluoro phosphate; diphenyliodonium phosphate; triarylsulfonium hexafluoroantimonate; or a combination thereof.

The cationic photoinitiator or photoacid generator, when present, may be up to about 10 wt % of the liquid resin formulation. In various embodiments, the cationic photoinitiator or photoacid generator is about 0.001, 0.005, 0.01, 0.05, 0.1, 0.5, 1, 2, 5, or 10 wt % of the liquid resin formulation.

In certain embodiments, the liquid resin formulation comprises a hydrogen donor that may be used to assist in the generation of a Brønsted acid in the cation or in acceleration of anionic photoinitiator reactions, for example. Exemplary hydrogen donors include, but are not limited to, tertiary amines, alcohols, ethers, esters, water, or a combination thereof. When present, the hydrogen donor may be up to about 2 wt % of the liquid resin formulation, such as about 0.001, 0.005, 0.01, 0.05, 0.1, 0.5, 1, or 1.5 wt % of the liquid resin formulation.

In some embodiments, the liquid resin formulation comprises a UV sensitizer that may be used to enable the long-UV-wavelength reaction of UV systems with photoinitiators which typically absorb at lower wavelengths. This is typically the case with cationic photoinitiators, which are generally limited to absorption up to about 325-375 nm, for example. UV sensitizers interact with UV light at higher wavelengths, generally into the 375-425 nm range, and then interact with the photoinitiator to create either free radicals and/or Brønsted acids. A UV sensitizer forms an excited triplet state under UV light absorption, and then via electron or energy transfer, reacts with a photoinitiator to generate free radicals and/or Brønsted acids. This initiates photopolymerizaton.

UV sensitizers may be selected from dibutoxyantracene, diethoxyanthracene, 1-chloro-4-propoxythioxanthone, 2-isopropylthioxanthone, 4-isopropylthioxanthone, or a combination thereof, for example. When present, the UV sensitizer may be up to about 5 wt % of the liquid resin formulation, such as about 0.001, 0.005, 0.01, 0.05, 0.1, 0.5, 1, 2, 3, or 4 wt % of the liquid resin formulation.

In some embodiments, including those utilizing free-radical polymerization, cationic polymerization, or both of these, the liquid resin formulation comprises one or more 3D-printing resolution agents selected from UV absorbers, fluorescents, optical brighteners, or a combination thereof.

A "3D-printing resolution agent" is a compound that improves print quality and resolution by containing the curing to a desired region of the laser or light exposure. In certain embodiments, the 3D-printing resolution agent functions by absorbing light (e.g., UV or visible light) at a desired wavelength and converting the energy either into thermal energy or radiation at a higher wavelength. The use of 3D-printing resolution agents improves print quality and resolution by containing the curing by the laser or light exposure to the desired region laterally and/or vertically in the print bath.

Exemplary 3D-printing resolution agents include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); 2,2'-(1,2-ethenediyl)bis(4,1-phenylene)bisbenzoxazole; or a combination thereof. When present, the 3D-printing resolution agent may be up to about 10 wt % of the liquid resin formulation, such as about 0.001, 0.01, 0.1, 0.5, 1, 2, 3, 4, 5, 6, 7, 8, or 9 wt % of the liquid resin formulation.

Some variations provide a liquid resin formulation comprising:

(a) a first molecule comprising two or more C=X double bonds, two or more C≡X triple bonds, or at least one C=X double bond and at least one C≡X triple bond, wherein X is selected from the group consisting of C, S, N, O, and combinations thereof, and wherein the first molecule optionally further comprises at least one non-carbon atom selected from the group consisting of Si, B, Al, Ti, Zn, P, Ge, S, N, O, and combinations thereof;

(b) optionally a second molecule comprising R—Y—H, wherein R is an organic group or an inorganic group, and wherein Y is selected from the group consisting of S, N, O, and combinations thereof (Y is not yttrium in this specification unless specifically stated as such);

(c) optionally a photoinitiator and/or a thermal free-radical initiator;

(d) optionally a free-radical inhibitor; and (e) optionally a 3D-printing resolution agent.

In some embodiments, the first molecule is present from about 3 wt % to about 97 wt % of the liquid resin formulation, such as about 4, 5, 10, 15, 20, 25, 30, 35, 40, 45, 50, 55, 60, 65, 70, 75, 80, 85, 90, or 95 wt %, for example.

In some embodiments, the first molecule contains two or more C=X double bonds, and at least one of these double bonds is located at a terminal position of the first molecule. In some embodiments, the first molecule contains two or more C≡X triple bonds, and at least one of these triple bonds is located at a terminal position of the first molecule. In some embodiments, the first molecule contains at least one C=X double bond and at least one C≡X triple bond, and the C=X double bond is located at a terminal position, or the C≡X triple bond is located at a terminal position, or both of the C=X double bond and the C≡X triple bond are located at (different) terminal positions within the first molecule. Note that a molecule may contain more than two terminal positions, when there is branching present.

In the first molecule, the non-carbon atom may be present in the main chain, in side chains, or in both of these.

The first molecule may include one or more functional groups selected from the group consisting of vinyl, ethynyl, vinyl ether, vinyl ester, vinyl amide, vinyl triazine, vinyl isocyanurate, acrylate, methacrylate, diene, triene, and analogues thereof. In some embodiments, the first molecule includes two or more of such functional groups. An "analogue" herein means that the functional group has similar chemical and reactive properties, with respect to the polymerization of the liquid resin formulation.

In some embodiments in which the second molecule is included in the liquid resin formulation, the second molecule is present from about 0.1 wt % to about 97 wt % of the liquid resin formulation, such as about 0.2, 0.5, 1, 2, 3, 4, 5, 10, 15, 20, 25, 30, 35, 40, 45, 50, 55, 60, 65, 70, 75, 80, 85, 90, or 95 wt %, for example.

The second molecule may include one or more functional groups selected from the group consisting of thiol, alkyl, ester, amine, hydroxyl, and functional analogs thereof. Alternatively, or additionally, the second molecule may be chemically contained within one or more functional groups selected from the group consisting of thiol, alkyl, ester, amine, hydroxyl, and analogues thereof.

When the second molecule is present, the R group may be, or include, an inorganic group containing an element selected from the group consisting of Si, B, Al, Ti, Zn, P, Ge, S, N, O, and combinations thereof.

In some embodiments, at least 5%, 10%, 15%, 20%, 25%, 30%, 35%, 40%, 45%, or 50% (mole percent) of the R group is inorganic, i.e. not carbon-containing. In certain embodiments, at least 5%, 10%, 15%, 20%, 25%, 30%, 35%, 40%, 45%, or 50% (mole percent) of the R group is specifically Si. The Si may be contained in Si—N linkages, Si—O linkages, Si—C linkages, and/or Si—Si linkages within the second molecule.

In the second molecule, the R group may be present in the main chain, in side chains, or in both of these. The non-carbon atom of the R group, when it is inorganic, may be the same as or different than the non-carbon atom in the first molecule.

The weight ratio of the second molecule to the first molecule may vary from about 0 to about 32, such as about 0.5, 1, 2, 3, 5, 10, 15, 20, 25, or 30. In some embodiments, the weight ratio of second molecule to first molecule is dependent on the ratio of thiol to vinyl. For example, in certain embodiments there is at least one thiol functional group per vinyl group.

As noted earlier, some variations employ a combination of free-radical polymerization and cationic polymerization. In some embodiments, a liquid resin formulation compatible with stereolithography or UV-cure 3D printing leverages both cationic and free-radical polymerization mechanisms, wherein the liquid resin formulation comprises:

(a) a first molecule comprising two or more C=X double bonds or C≡X triple bonds, wherein X is selected from C and/or S, or from C, S, O, and/or N, and wherein the first molecule optionally further contains at least one non-carbon atom in the main chain or side chains selected from the group consisting of Si, B, Al, Ti, Zn, P, S, Ge, and combinations thereof;

(b) a second molecule comprising two or more thiol (SH) groups, wherein the second molecule optionally further contains at least one non-carbon atom in the main chain or side chains selected from the group consisting of Si, B, Al, Ti, Zn, P, S Ge, and combinations thereof (preferably at least 10 wt %, more preferably at least 40 wt %, of the non-carbon atoms being inorganic, such as Si), and wherein the second molecule may be a part of an alkyl group, ester group, amine group, or hydroxy group;

(c) a third molecule comprising two or more functional groups selected from aliphatic ether, cyclic ether, vinyl ether, epoxy, cycloaliphatic epoxy, oxetane, or a combination thereof, wherein the third molecule optionally further contains at least one non-carbon atom in the main chain or side chains selected from the group consisting of Si, B, Al, Ti, Zn, P, S, Ge, and combinations thereof;

(d) optionally a photoinitiator that generates free radicals by intramolecular bond cleavage and/or intermolecular hydrogen abstraction under exposure to light having a wavelength from about 200 nm to about 500 nm;

(e) optionally a cationic photoinitiator or photoacid generator that generates Brønsted acids under a light exposure;

(f) optionally a free-radical inhibitor in a sufficient amount to inhibit unwanted polymerization of regions outside the desired exposure and deter shadow curing;

(g) optionally UV absorbers, fluorescents, and/or optical brighteners in a sufficient amount to improve print quality and resolution by containing the curing to the region of the laser or light exposure to the desired region;

(h) optionally a UV sensitizer to enable the long-UV-wavelength reaction of UV systems with photoinitiators that typically absorb at lower wavelengths, forming an excited triplet state under UV light absorption, followed by electron or energy transfer to react with a photoinitiator to generate free radicals and/or Brønsted acids, thereby initiating photopolymerizaton; and (i) from about 0.1 vol % to about 95 vol % of one or more solid polymer fillers as set forth herein.

In some embodiments, the preceramic composition further comprises one or more solid ceramic fillers or solid metal fillers, in addition to the solid polymer filler. A solid ceramic filler or solid metal filler is a ceramic or metal material that (a) forms at least one solid phase at 25° C. and 1 atm, and (b) enhances at least one chemical, physical, mechanical, or electrical property within the preceramic composition or a reaction product thereof.

The solid ceramic or metal filler may be from about 0.1 vol % to about 70 vol % of the preceramic composition, with the majority of the remainder typically being the liquid resin formulation and the solid polymer filler.

The geometric shape of the solid ceramic or metal filler may be fibers including short fibers (1-100 micrometers in length) or long fibers (>100 micrometers in length), whiskers, nanotubes, nanorods, flat platelets, microparticles with diameters between 1 and 100 micrometers, nanoparticles with diameters between 1 and 1000 nanometers, or a combination thereof.

In some embodiments, to increase fracture toughness of a 3D-printed part, solid ceramic or metal fillers with aspect ratios of at least 2 are preferred, such as fibers, whiskers, nanotubes, and nanorods. Here, "aspect ratio" is the ratio of average length to average width, or in the case of an arbitrary shape, the ratio of average maximum length scale to average minimum length scale. The solid ceramic or metal filler aspect ratio is preferably at least 5, more preferably at least 10, in certain embodiments.

The solid ceramic or metal filler is preferably stable at a pyrolysis temperature of at least 800° C., so as not to disintegrate, melt, or vaporize during later conversion of a preceramic polymer to a ceramic material. Note that the solid ceramic or metal filler may react at pyrolysis temperatures with other components present in the preceramic composition or its reaction products (e.g., preceramic polymer) or with furnace atmosphere gases. It is possible for a portion of the solid ceramic or metal filler to react away into the vapor phase, or into a liquid phase, during high-temperature processing.

In certain embodiments, a solid ceramic or metal filler precursor is introduced to the preceramic composition, wherein the precursor is in a liquid phase or is a gel, for example. The precursor may then react or undergo a phase change, such as during polymerization, to convert the precursor into a solid ceramic or metal filler.

The optional solid ceramic or metal filler may have a wide range of compositions. For example, solid ceramic or metal filler compositions may include, but are not limited to, silicon-based ceramics such as SiOC, $SiO_2$, SiCN, SiC, SiCBN, SiOCN, $Si_3N_4$, silicate glasses, etc. Solid ceramic or metal filler compositions may include non-silicon-based ceramics such as metal oxides, e.g. $Al_2O_3$, $ZrO_2$, $TiO_2$, or $Y_3Al_5O_{12}$. Solid ceramic or metal filler compositions may include carbon-based, high-temperature materials such as carbon, graphene, diamond, and metal carbides, e.g. TiC, ZrC, HfC, or $B_4C$. Solid ceramic or metal filler compositions may include nitride-based ceramics, e.g. BN, TiN, ZrN, or AlN. Solid metal filler compositions may include pure metals or metal alloys, such as (but not limited to) alkali metals, alkaline earth metals, transition metals, post-transition metals, or combinations or alloys thereof.

Solid ceramic or metal fillers in a resin interact with UV light according to Snell's law and the well-known Fresnel equations. These laws of physics determine the fractions of the light that are reflected, transmitted, or absorbed when UV light passes from resin to filler. For a UV-based 3D printing process, it is preferred that the solid fillers do not absorb too much UV light which would hinder complete UV curing of the resin.

To avoid absorption of too much UV light, a low level of solid ceramic or metal filler (if any) may be employed, such as less than 10 vol % of relatively small (e.g., 10 micron or smaller) particles. Alternatively, or additionally, a solid ceramic or metal filler that is somewhat transparent to UV light and lets UV light pass through, may be employed.

Another approach to ensure that UV light is not excessively absorbed by the filler particles is to employ solid particles with a surface that reflects UV light. For example, aluminum reflects UV light well. For maximum reflection, the surface of such particle should be smooth. Surface treatments or coatings may be applied to render the surface of filler particles reflective—such as a thin coating of aluminum or silver.

Preferred solid ceramic or metal filler materials, in some embodiments, are short fibers of alumina ($Al_2O_3$), quartz ($SiO_2$), glass, silicon nitride ($Si_3N_4$), yttrium aluminum garnet (YAG), or boron nitride (BN) because these materials transmit at least some UV light. SiC or C fibers absorb significant UV light and therefore should be coated with a reflective coating, to enable efficient 3D printing.

Depending on the chemistry and viscosity of the liquid resin formulation, the solid ceramic or metal filler (when employed) may be treated to increase its compatibility with and wetting of the resin, the solubility and dispersion of the filler in the resin, and/or the bonding between the filler and the resin. In some embodiments, dispersion aids may be chosen to match the isoelectric point of the solid ceramic or metal filler particle and the chemistry and functionality of the resin formulation or the solid ceramic or metal filler.

Some embodiments employ surfactants with a component that bonds to the surface of the solid ceramic or metal filler and a component that solvates in the resin system. Surface functionality may be added to the surface of the solid ceramic or metal filler by covalently bonding a functional group to the surface of the filler, as is the case with solid polymer fillers discussed above. The surface of the solid ceramic or metal filler may also be modified through other chemical means, such as vapor-solid reactions or liquid-solid reactions, e.g. oxidation in a furnace or acid or base treatments.

For the 3D printing and curing of the resin, it can also be advantageous if the solid ceramic or metal filler itself (when present) is coated or surface-treated with a chemical that contains a functional group that aids in polymerization or crosslinking of the resin on UV and/or thermal exposure. Such functional groups may include unsaturated ethers, vinyls, acrylates, methacrylates, cyclic ethers, epoxies, oxetanes, amines, hydroxyls, isocyanates, hydrides, or combinations thereof. By adding functional groups to the surface of the solid ceramic or metal filler, fewer or even no functional groups are necessary in the resin and the system can still be cured by UV exposure. Alternatively, or additionally, functional groups introduced to the surface of the solid ceramic or metal filler particles may enable a thermal cure after initial UV curing during 3D printing.

The solid ceramic or metal filler may be coated to protect it from environmental degradation during pyrolysis. Reactive species such as oxygen free radicals, and other free radicals, may be generated during pyrolysis. Such free radicals can react with the fillers and degrade their properties. To mitigate this, the fillers may be coated with a thin layer of a protective material such as BN or a sacrificial material such as carbon that preferentially decomposes during pyrolysis.

To increase fracture toughness of a 3D-printed ceramic matrix composite, a high-aspect-ratio filler, such as a fiber, may be coated with a filler/matrix interfacial coating. The purpose of this coating is to provide a weak filler-matrix interface that prevents matrix cracks from penetrating the fillers—thus providing damage tolerance (toughness) to the composite. The interfacial coating is preferably chemically and mechanically stable during processing and pyrolysis. Examples of interfacial coatings include BN, C, AlN, or a combination thereof.

In some variations, active solid-phase functional additives are included. By "solid-phase functional additives" it is meant a material that (a) forms at least one solid phase at 25° C. and 1 atm, and (b) performs or enhances at least one chemical, physical, mechanical, or electrical function within the ceramic structure as it is being formed and in the final structure.

Note that the optional solid-phase functional additives are distinguished from the solid ceramic or metal fillers disclosed above. Compared to solid fillers, solid-phase functional additives actively improve the final ceramic structure through one or more changes explicitly induced by the additives during pyrolysis or other thermal treatment, as will now be described. Also, the solid-phase functional additives are different than the solid polymer fillers.

The solid-phase functional additives may be present from about 0.1 vol % and 70 vol % of the preceramic composition. The solid-phase functional additive geometry varies. In some embodiments, the solid-phase functional additives are small particles with average sizes (length or effective diameter) from 5 nanometers to 5 micrometers.

In some embodiments, the solid-phase functional additives actively expand in volume and counteract the shrinkage of the resin, eliminating or reducing the overall shrinkage during conversion of the polymer to ceramic.

On conversion from polymer to ceramic, typically about 20-30% linear dimensional shrinkage and about 20-60% mass loss are observed. The shrinkage facilitates cracking and distortion, and limits the achievable part size and tolerances. By introducing active solid-phase functional additives that expand in volume during pyrolysis, the shrinkage of the preceramic polymer is counteracted. The overall shrinkage during conversion of the polymer to ceramic can be reduced or even eliminated.

Note that the solid-phase functional additives are not necessarily stable (unreactive) at pyrolysis temperatures. In many case, it is desired that the functional additives are reactive.

In particular, the solid-phase functional additives may react with the preceramic composition directly on heat treatment. Alternatively, or additionally, the solid-phase functional additives may react with species (e.g., oxygen, nitrogen or carbon) generated from decomposition of the preceramic polymer during pyrolysis.

Alternatively, or additionally, the solid-phase functional additives may react with the pyrolysis atmosphere during the pyrolysis, for example with a nitrogen, methane, or ammonia atmosphere. To counteract the detrimental effects of shrinkage, it is preferred that these reactions happen at the same time as the preceramic polymer shrinks, or are effective to reverse the volume reduction.

Examples of solid-phase functional additives for counteracting the shrinkage of the preceramic polymer include, but are not limited to, scandium, yttrium, titanium, zirconium, hafnium, vanadium, niobium, tantalum, chromium, molybdenum, tungsten, manganese, iron, cobalt, nickel, zinc, boron, aluminum, gallium, silicon, germanium, phosphorus, or combinations thereof. Combinations of these elements such as titanium silicide, chromium silicide, magnesium silicide, zirconium silicide, or molybdenum silicide may be used as the solid-phase functional additives. Preferred solid-phase functional additives in this category include aluminum, titanium, zirconium, titanium silicide, chromium silicide, magnesium silicide, and zirconium silicide.

In some embodiments, the solid-phase functional additives actively bind sulfur. For example, the solid-phase functional additives may react with sulfur from thiol groups in the resin and bind the sulfur into stable compounds. One class of preferred UV-curable preceramic resins for 3D printing is based on the thiol-ene reaction (alkene hydrothiolation). The thiol groups contain sulfur which can partially remain in the ceramic after pyrolysis, causing an unpleasant smell. Residual sulfur can also corrode metals.

To mitigate the negative effects of residual sulfur, active solid-phase functional additives may be added that react with the sulfur and bind the sulfur in stable compounds that are neutral in smell and neutral with respect to corrosion of metals. Examples of solid-phase functional additives for binding with sulfur include, but are not limited to, Ti, Zr, Hf, Si, Al, Cr, Nb, $CrSi_2$, $TiSi_2$, or a combination thereof. Preferred sulfur gathering/scavenging solid-phase functional additives are Ti, Zr, and Hf which react to form the stable compounds $Ti_2S_3$, $ZrS_2$, and $HfS_2$, respectively.

In some embodiments, the solid-phase functional additives actively seed crystallization of a preferred ceramic phase by enabling epitaxial growth of the preferred phase without a nucleation barrier. After pyrolysis of preceramic polymers, an amorphous ceramic is usually obtained. To increase strength and hardness, and reduce high-temperature creep, the amorphous ceramic material needs to then be crystallized into a preferred ceramic phase. This is typically achieved by a long (many hours) heat treatment at temperatures above the pyrolysis temperature, performed right after the pyrolysis or as a distinct second heat treatment.

By contrast, with appropriate solid-phase functional additives, crystallization may be facilitated by seeding crystallization. Without limitation, the mechanism may include providing a surface for epitaxial growth of the preferred phase or multiple ceramic phases.

For example, the crystallization of β-SiC in an amorphous SiC or SiCN ceramic derived from a polycarbosilane-based or polysilazane-based resin can be facilitated by small (e.g., 1 nanometer to 5 microns) β-SiC crystals. Crystallization of such a resin may be performed at temperatures between 1300° C. and 2800° C. over the course of 5 to 50 hours. Similarly, the crystallization of the α phase or β phase of $Si_3N_4$ in an amorphous $Si_3N_4$ or SiCN ceramic derived from a polysilazane-based resin can be facilitated by small (e.g., 50 nanometers to 5 microns) α-$Si_3N_4$ or β-$Si_3N_4$ crystals, respectively. Other crystals may be chosen to facilitate crystallization, with the typical constraint of epitaxial growth on one crystal facet with low lattice strain.

The formulations disclosed herein may be 3D-printed using many different methods. In some variations, the formulations may be directly 3D-printed and converted to free-form ceramic matrix composite structures. A 3D-printed preceramic polymer material may be prepared directly from preceramic compositions, with no intervening steps being necessary. A 3D-printed ceramic material may then be prepared directly from the 3D-printed preceramic polymer material, with no intervening steps being necessary.

Typically, a preceramic composition is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place. In some embodiments, a preceramic resin formulation is first polymerized, followed by 3D printing of the already-made polymer (e.g., a thermoplastic material).

In stereolithography, the solid polymer filler (and optionally an additional solid ceramic or metal filler) is dispersed in the liquid resin formulation. Layers are cured from the top or bottom using UV-laser rastering, projection micro-stereo-lithography, digital light projection, or liquid crystal device projection, for example. Smaller filler sizes are preferred since the filler size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of the solid polymer filler (and optionally an additional solid ceramic or metal filler) is spread out and liquid resin formulation is jetted on selected locations and cured such as via UV light or thermally. This process is similar to conventional binder jetting methods, but instead of a binder, a preceramic monomer formulation is used. The solid polymer filler may initially be spread out on a substrate or on a region of polymer based on the selected monomer, for example. After an initial step of binder jetting, another layer of the solid polymer filler may be spread out on a 3D-printed polymer layer, followed by resin jetting and curing. This process may be repeated many times for large parts.

In resin jetting with fiber placement, solid polymer fillers (and optionally additional solid ceramic or metal fillers) in the form of long or short fibers are placed in the preferred location and aligned in the preferred direction. Subsequently, liquid resin formulation is jetted in selected locations and cured. The process is repeated layer-by-layer to build a part. Resin jetting with fiber placement enables printing of parts with high volume fraction (such as 30-60 vol %) of aligned fibers, resulting in improved mechanical properties for the final ceramic structure (following pyrolysis).

In polyjetting, a mixture of liquid resin formulation and solid polymer fillers (and optionally additional solid-phase fillers) is jetted and written into the desired pattern. As the mixture is dispensed, it is exposed to UV light such as a laser, LED, or plasma sources, and cured into a polymer. Multiple mixtures are able to be dispensed through different nozzles, allowing for more than one type of monomer-filler mixture to be utilized simultaneously. This results in tailored mechanical properties for the final ceramic structure (following pyrolysis).

In extrusion printing, the liquid resin formulation and filler(s) mixture is squeezed through a micro-nozzle, or multiple micro-nozzles, and cured via UV light. One advantage is that high-aspect-ratio fillers can be aligned with the extrusion process. Alignment generally improves mechanical properties in the aligned direction.

After a part is 3D printed using any of the above methods, or another method, the part may be post-cured. An optional thermal post-cure of the 3D polymer is performed after the 3D printing but prior to the pyrolysis to produce the ceramic structure. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

In some embodiments, the curing or conversion of the preceramic composition to a preceramic polymer includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks. See, for example, commonly owned U.S. patent application Ser. No. 15/391,749, filed Dec. 27, 2016, which is hereby incorporated by reference herein, regarding reversible crosslinks.

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time (such as from 10 minutes to 1 week) under various inert or reactive atmospheres.

Thermal treatment may be done for an extended period of time under various inert or reactive atmospheres, including but not limited to $N_2$, Ar, He, air, $CO_2$, CO, $H_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 2000° C., such as from about 800° C. to about 1100° C. When it is desired to convert the polymerized liquid resin formulation into ceramic material, the selected temperature needs to at least be equal to the pyrolysis temperature of the polymerized liquid resin formulation (a polymer property defined above), and preferably greater than such pyrolysis temperature, such as at least 50° C., 100° C., 200° C., 300° C., 400° C., or 500° C. greater than the pyrolysis temperature of the polymerized liquid resin formulation.

When it is desired to convert the solid polymer filler also into ceramic material, the selected temperature needs to at least be equal to the pyrolysis temperature of the solid polymer filler, and preferably greater than such pyrolysis temperature, such as at least 50° C., 100° C., 200° C., 300° C., 400° C., or 500° C. greater than the pyrolysis temperature of the solid polymer filler.

Slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes, for example. Following pyrolysis, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

The thermal treatment is preferably performed following polymerization and any (optional) thermal post-cure of the 3D-printed polymer. In certain embodiments, the thermal treatment is combined (i.e., overlaps in time and/or temperature) with polymerization, thermal post-cure, or both. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 2000° C. The system pressure may also be adjusted to influence the gas atmosphere.

In some embodiments, the solid polymer filler and the preceramic polymer (from polymerization of the liquid resin formulation) pyrolyze in parallel to form a cohesive ceramic structure. The ceramic microstructure may be homogenous or heterogeneous. That is, regions derived from pyrolysis of the preceramic polymer may be heterogeneous with discrete regions derived from pyrolysis of the solid polymer filler. Or, the final ceramic structure may be homogeneous, without discrete regions derived from pyrolysis of the preceramic polymer versus those derived from pyrolysis of the solid polymer filler.

Following pyrolysis or other thermal treatment, the ceramic material comprises chemically and/or physically interconnected ceramic materials such as, but not limited to, silicon oxycarbide (SiOC), silicon carbide (SiC), silicon nitride ($Si_3N_4$), silicon oxynitride (SiON), silicon oxycarbonitride (SiOCN), silicon carbonitride (SiCN), silicon boronitride (SiBN), silicon boron carbonitride (SiBCN), boron nitride (BN), and/or silicon metal carbides, oxides, or nitrides. The ceramic materials may be interconnected in a solid solution, and/or there may be chemical bonds between individual ceramic particles. There may also be an interface layer between ceramic materials. The ceramic materials may be interconnected within a three-dimensional structure.

The composition of the ceramic part or ceramic matrix composite obviously is directly dependent on the composition of the starting preceramic composition as provided in this disclosure.

When carbon is desired in the ceramic material, the fraction of carbon may be tailored, for example, by adding phenyl groups on the preceramic polymer and/or on the solid polymer filler, or by using a carbon-based crosslinking agent such as divinyl benzene.

In some embodiments, final ceramic structures are lightweight, strong, and stiff—but can withstand a high-temperature oxidizing environment. The configuration and microstructure of the preceramic polymer determine the composition, microstructure, and yield of the ceramic material after thermal treatment. A high crosslink density may be preferred to prevent the fragmentation and loss of low-molecular-mass species, which have not fully converted to either ceramic or escaping gases, during thermal treatment.

During the thermal treatment, whether an inert or reactive thermal treatment technique is employed, gases escape. Gases are formed during the conversion of preceramic polymer to the ceramic structure, by decomposition reactions of the polymer and other materials present. The escaping gases or vapors may include (but are by no means limited to) $CH_4$, $H_2$, CO, $CO_2$, $H_2O$, $SO_2$, $H_2S$, $CH_3S$, etc.

The final ceramic structure may be characterized by an actual density that is at least 50% of theoretical density, preferably at least 75% of theoretical density, and more preferably at least 95% of theoretical density. By "theoretical density" it is meant the density of the material itself, calculated in the absence of porous voids. For example a ceramic structure with absolute density of 2.0 g/cm$^3$, fabricated from a base material with inherent (bulk) density of 2.1 g/cm$^3$, exhibits 2.0/2.1=95% of theoretical density. In certain embodiments, without limitation, the ceramic structure is a fully dense monolith, which means that the ceramic structure has at least 99% (e.g., essentially 100%) of theoretical density associated with a part or continuous region of material (also referred to as a "monolith"). The absolute density in g/cm$^3$ will vary, depending on the selection of base materials; an exemplary range is about 1 g/cm$^3$ to about 5 g/cm$^3$.

The overall mass loss associated with the conversion of preceramic polymer to the ceramic structure may vary widely, such as from about 1 wt % to about 90 wt %, e.g. about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Associated with mass loss may be shrinkage of the preceramic polymer as it converts to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage, unless certain solid-phase fillers are utilized as described above. These embodiments tend to produce lower porosity, or no porosity, and therefore higher densities (e.g., fully dense ceramic materials). Finally, in some embodiments, there is little mass loss but shrinkage associated with chemical reactions taking place. These embodiments also tend to produce relatively high densities.

Despite shrinkage, if any, the bulk shape (relative geometry) of the preceramic 3D-printed polymer may be preserved in the final ceramic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage occurs when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage, in certain embodiments employing active functional additives) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

The strength of the final ceramic material will vary, depending on the initial preceramic composition, as well as the processing parameters. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C.

The thermal stability of the final ceramic material will vary, depending primarily on the initial preceramic resin formulation, as well as the processing parameters. In various embodiments, the final ceramic material is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher.

Multiple ceramic structures may be obtained and then joined, using methods such as, but not limited to, those described in commonly owned U.S. patent application Ser. No. 15/840,146, filed on Dec. 13, 2017, which is hereby incorporated by reference.

The final ceramic structure, even when no machining, polishing, bonding, surface finishing, or assembly is required, may be subjected to coloring (e.g., with inks or dyes), stamping, or other non-functional features, if desired.

EXAMPLE

An embodiment of the invention is reduced to practice in this Example of a preceramic composition containing a radiation-curable liquid resin formulation and a solid polymer filler dispersed within the liquid resin formulation.

The radiation-curable liquid resin formulation is a monomer mixture containing 100 parts by weight of vinylmethoxysiloxane polymer, 100 parts by weight of (mercaptopropyl) methylsiloxane polymer, and 0.5 parts by weight of 2,2-dimethyl-2-phenylacetophenone.

The solid polymer filler in this example is a solid preceramic polymer obtained by polymerizing a preceramic monomer mixture of 0.2% dicumyl peroxide ($C_{18}H_{22}O_2$) as a polymerization initiator in allyl hydrido polycarbosilane, via thermal cure at 150° C. for 240 minutes. The thermally cured polymer is ball milled for 24 hr and then sifted to recover solid polymer particulate sizes below 45 μm, as the solid polymer filler.

The liquid resin formulation with monomer mixture containing 100 parts by weight of vinylmethoxysiloxane polymer, 100 parts by weight of (mercaptopropyl)methylsiloxane polymer, and 0.5 parts by weight of 2,2-dimethyl-2-phenylacetophenone, and the solid polymer filler are then blended to form a preceramic mixture containing 60 parts by weight of the liquid resin formulation and 40 parts by weight of the solid polymer filler. The preceramic mixture is sonicated for 15 minutes at a sound-energy frequency of 24 kHz.

The preceramic mixture is then exposed to UV light at a wavelength of about 200-400 nm with a light intensity of 100 mW/cm$^2$, to cause polymerization of the preceramic mixture into a preceramic polymer.

A control mixture containing the liquid resin formulation but not the solid polymer filler is also exposed to UV light at a wavelength of about 200-400 nm with a light intensity of 100 mW/cm$^2$, to cause polymerization of the liquid resin formulation into a resin-only preceramic polymer as a control.

The resulting UV-cured preceramic polymer is then pyrolyzed in an argon atmosphere (pressure of about 1 atm) by ramping the temperature to 1000° C. at a heating rate of about 1° C./min. The material is held at 1000° C. for about 60 minutes, following by cooling to ambient conditions at a cooling rate of about −2° C./min. A cohesive ceramic material is observed.

Figure 1A:
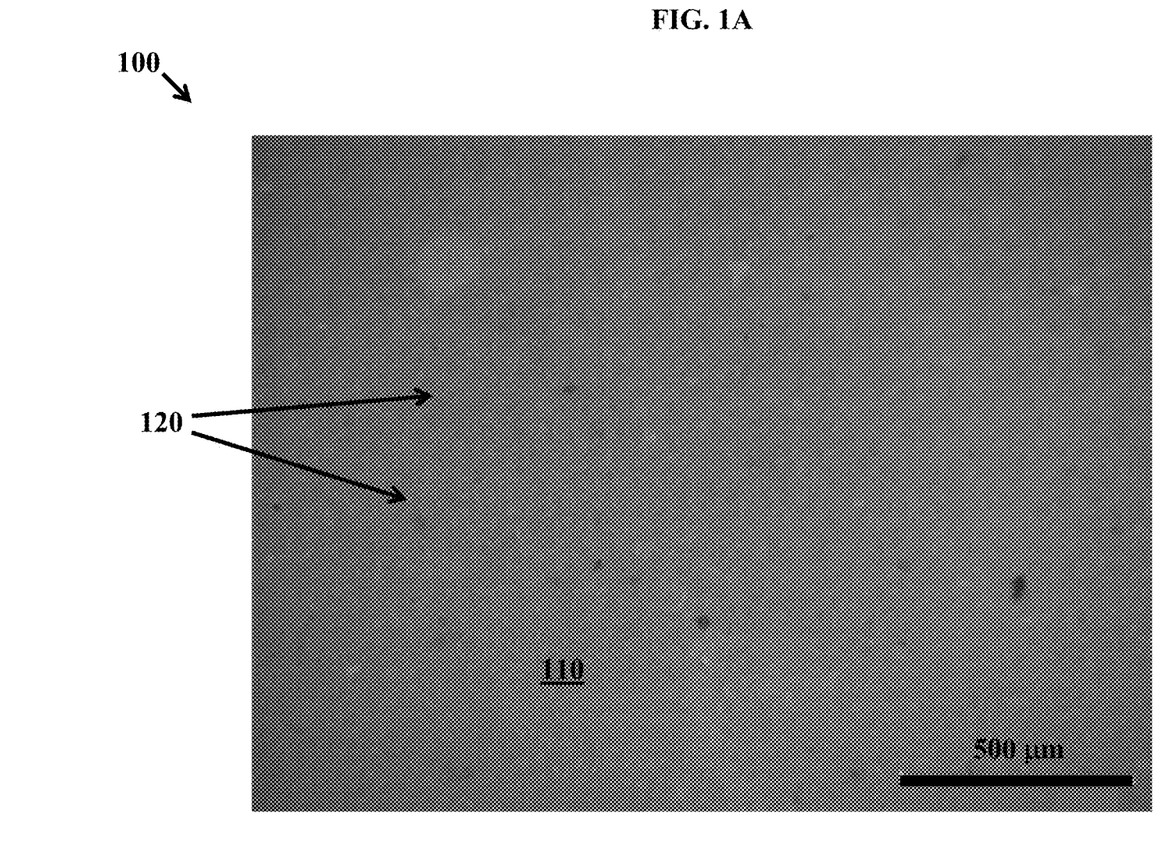
FIG. 1A is an optical microscope image (scale bar=500 µm) of a UV-cured preceramic polymer loaded with a solid polymer filler, before pyrolysis, in the Example herein.
Figure 1B:
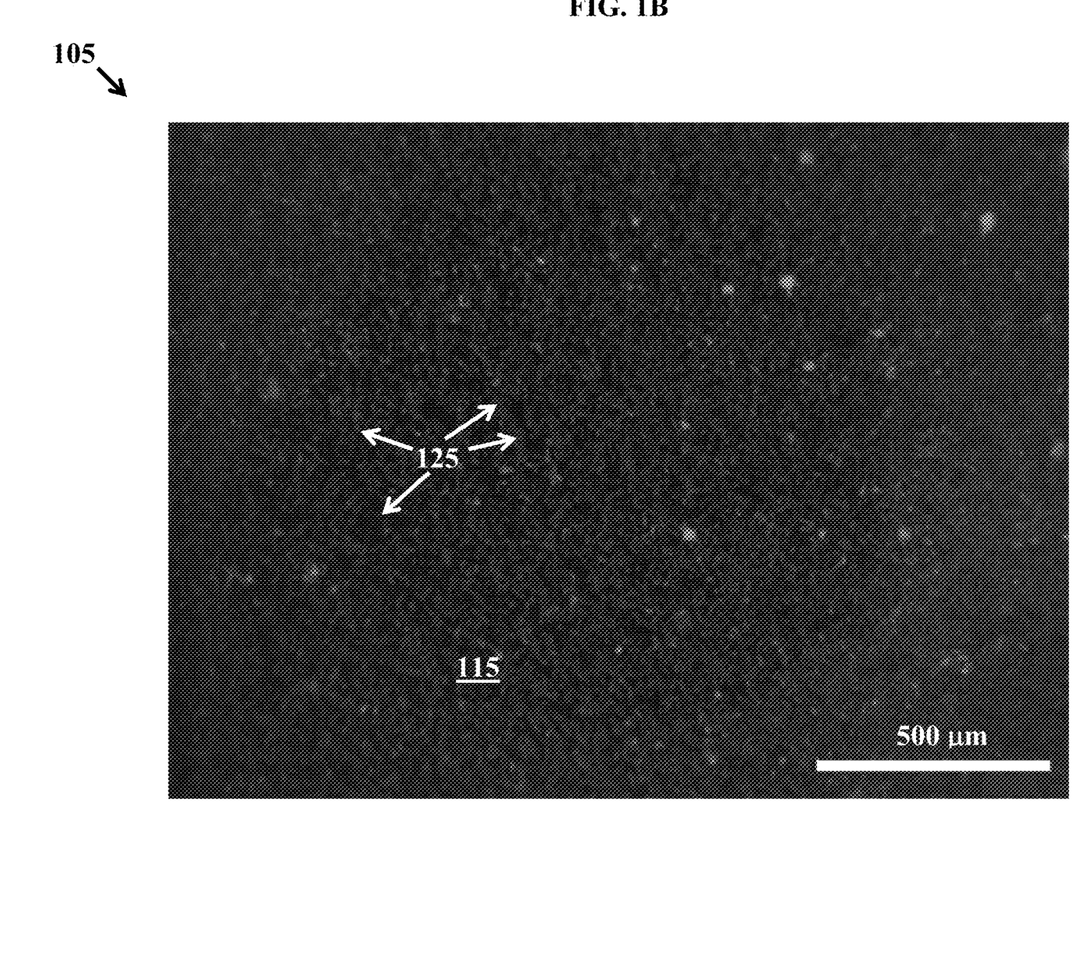
FIG. 1B is an optical microscope image (scale bar=500 µm) of a pyrolyzed form of a UV-cured preceramic polymer loaded with a solid polymer filler, in the Example herein.

FIG. 1A is an optical microscope image 100 (scale bar=500 μm) of the UV-cured preceramic polymer 110 loaded with the above-described solid polymer filler 120, before pyrolysis. FIG. 1B is an optical microscope image 105 (scale bar=500 μm) of the pyrolyzed form of the UV-cured preceramic polymer 115 loaded with the solid polymer filler 125 (the polymer 115 and the solid polymer filler 125 are both in pyrolyzed form in FIG. 1B). The material in FIG. 1B is a cohesive ceramic material.

Figure 2:
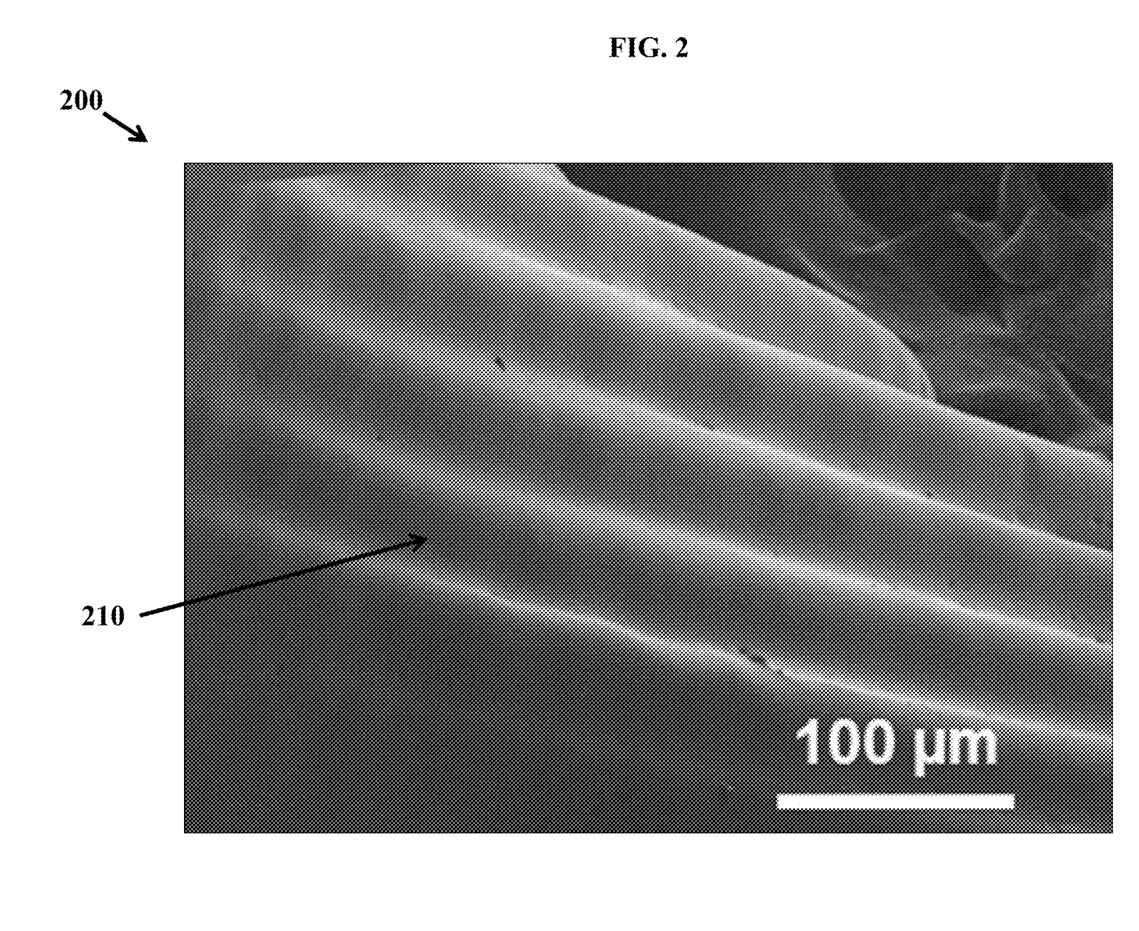
FIG. 2 is an SEM image (scale bar=100 µm) of a pyrolyzed form of a UV-cured preceramic polymer that does not contain the solid polymer filler, as a control.

FIG. 2 is a scanning electron microscope (SEM) image 200 (scale bar=100 μm) of a pyrolyzed form of the UV-cured preceramic polymer 210 that does not contain the solid polymer filler, as a control. That is, FIG. 2 shows the structure of the resin-only preceramic polymer following pyrolysis.

Figure 3:
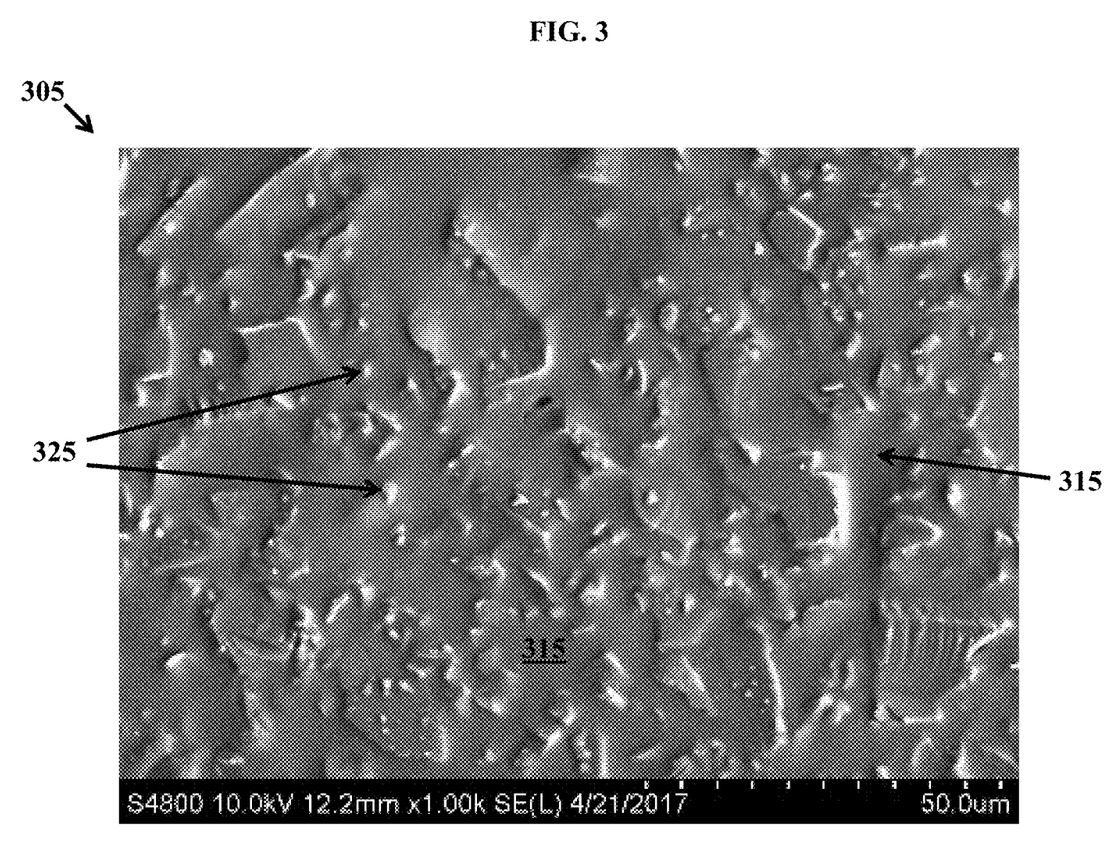
FIG. 3 is an SEM image (scale bar=50 µm) of a pyrolyzed form of a UV-cured preceramic polymer loaded with 35 wt % of a solid polymer filler, in the Example herein.

FIG. 3 is an SEM image 305 (scale bar=50 μm) of a pyrolyzed form of the UV-cured preceramic polymer 315 loaded with 40 wt % of the solid polymer filler 325. The ceramic material shown in FIG. 3 is the same as the ceramic material shown in FIG. 1B, with FIG. 3 being more magnified. A substantially uniform ceramic microstructure is revealed in FIG. 3.

Figure 4:
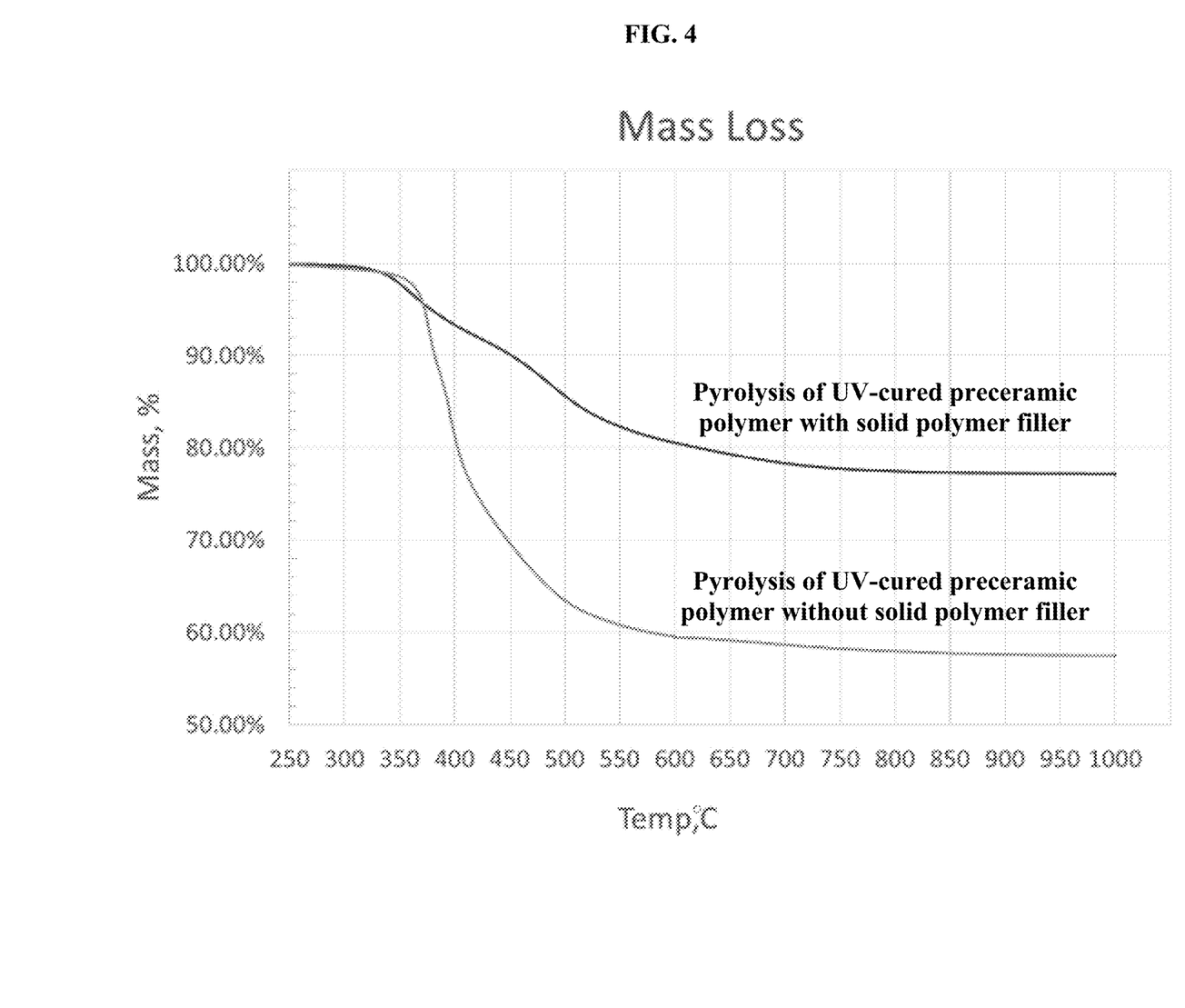
FIG. 4 is a plot of thermogravimetric analysis for pyrolysis of a UV-cured preceramic polymer with 35 wt % of a solid polymer filler, compared to pyrolysis of a UV-cured preceramic polymer without solid polymer filler, in the Example herein.

FIG. 4 is a plot of thermogravimetric analysis for the pyrolysis of the UV-cured preceramic polymer with 40 wt % (top curve) and 0 wt % (bottom curve) of the solid polymer filler. There is about 23% mass loss upon pyrolysis for the preceramic polymer containing solid polymer filler (i.e., the final material shown in FIG. 1B and FIG. 3). There is about 43% mass loss upon pyrolysis for the preceramic polymer containing no solid polymer filler (i.e., the final material shown in FIG. 2).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

This specification hereby incorporates by reference Eckel et al., "Additive manufacturing of polymer-derived ceramics" *Science*, volume 351, issue 6268, pages 58-62, January 2016.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A preceramic composition containing (a) a UV-curable inorganic liquid resin formulation, (b) a solid polymer filler dispersed within said UV-curable inorganic liquid resin formulation, and (c) a photoinitiator, wherein said UV-curable inorganic liquid resin formulation is capable of being polymerized when exposed to said photoinitiator and electromagnetic radiation wavelengths selected from 200 nm to 700 nm, wherein said solid polymer filler is selected from the group consisting of poly(carbosilanes), poly(silazanes), poly(silsesquioxanes), poly(borosiloxanes), poly(borosilanes), poly(borosilazanes), poly(carbosiloxanes), poly(silylcarboimides), poly(silsesquicarbodiimides), polyborazines, and combination thereof.

2. The preceramic composition of claim 1, wherein said electromagnetic radiation wavelengths are selected from 200 nm to 500 nm.

3. The preceramic composition of claim 1, wherein said solid polymer filler is present at a concentration from about 0.1 vol % to about 95 vol % of said preceramic composition.

4. The preceramic composition of claim 3, wherein said solid polymer filler is present at a concentration from about 1 vol % to about 70 vol % of said preceramic composition.

5. The preceramic composition of claim 1, wherein said solid polymer is characterized by a pyrolysis temperature equal to, or greater than, the pyrolysis temperature of a polymer of said UV-curable inorganic liquid resin formulation.

6. The preceramic composition of claim 1, wherein said solid polymer is characterized by a pyrolysis temperature less than the pyrolysis temperature of a polymer of said UV-curable inorganic liquid resin formulation.

7. The preceramic composition of claim 1, wherein said solid polymer filler is itself an inorganic preceramic polymer.

8. The preceramic composition of claim 7, wherein said solid polymer filler has the same composition as a polymer of said UV-curable inorganic liquid resin formulation.

9. The preceramic composition of claim 7, wherein said solid polymer filler has a different composition than a polymer of said UV-curable inorganic liquid resin formulation.

10. The preceramic composition of claim 1, wherein a surface of said solid polymer filler is modified to aid dispersion of said solid polymer filler within said UV-curable inorganic liquid resin formulation.

11. The preceramic composition of claim 1, said preceramic composition further comprising a surfactant or dispersion agent.

12. The preceramic composition of claim 1, said preceramic composition further comprising a solid metal filler and/or a solid ceramic filler.

13. The preceramic composition of claim 12, wherein said preceramic composition comprises a solid metal filler that has a melting temperature equal to, or greater than, the pyrolysis temperature of said UV-curable inorganic liquid resin formulation when in polymerized form.

14. The preceramic composition of claim 12, wherein said preceramic composition comprises a solid metal filler that has a melting temperature less than the pyrolysis temperature of said UV-curable inorganic liquid resin formulation when in polymerized form.

15. A preceramic composition containing (a) a UV-curable inorganic liquid resin formulation, (b) a solid polymer filler dispersed within said UV-curable inorganic liquid resin formulation, and (c) a photoinitiator, wherein said UV-curable inorganic liquid resin formulation is capable of being polymerized when exposed to said photoinitiator and electromagnetic radiation wavelengths selected from 200 nm to 700 nm, wherein said solid polymer filler is itself an inorganic preceramic polymer that has the same composition as a polymer of said UV-curable inorganic liquid resin formulation.

16. A preceramic composition containing (a) a UV-curable inorganic liquid resin formulation, (b) a solid polymer filler dispersed within said UV-curable inorganic liquid resin formulation, and (c) a photoinitiator, wherein said UV-curable inorganic liquid resin formulation is capable of being polymerized when exposed to said photoinitiator and electromagnetic radiation wavelengths selected from 200 nm to 700 nm, wherein said solid polymer filler is a boron-based polymer.

* * * * *